United States Patent
Myong

(10) Patent No.: US 9,281,644 B2
(45) Date of Patent: Mar. 8, 2016

(54) POWER STRIP HAVING A FIRST POWER CORD WITH A 110-120V PLUG AND A SECOND POWER CORD WITH A 220-240V PLUG

(71) Applicant: Kwang Rok Myong, Langley (CA)

(72) Inventor: Kwang Rok Myong, Langley (CA)

( * ) Notice: Subject to any disclaimer, the term of this patent is extended or adjusted under 35 U.S.C. 154(b) by 0 days.

(21) Appl. No.: 13/792,647

(22) Filed: Mar. 11, 2013

(65) Prior Publication Data

US 2014/0256187 A1   Sep. 11, 2014

(51) Int. Cl.
| | | |
|---|---|---|
| H01R 31/02 | (2006.01) | |
| H01R 25/00 | (2006.01) | |
| H01R 31/06 | (2006.01) | |
| H01R 103/00 | (2006.01) | |
| H01R 13/703 | (2006.01) | |
| H01R 13/713 | (2006.01) | |
| H01R 13/717 | (2006.01) | |
| H01R 24/28 | (2011.01) | |
| H02J 3/00 | (2006.01) | |
| H02J 13/00 | (2006.01) | |

(52) U.S. Cl.
CPC .............. *H01R 25/003* (2013.01); *H01R 31/02* (2013.01); *H01R 31/065* (2013.01); *H01R 13/7038* (2013.01); *H01R 13/7135* (2013.01); *H01R 13/7137* (2013.01); *H01R 13/7177* (2013.01); *H01R 24/28* (2013.01); *H01R 2103/00* (2013.01); *H02J 3/00* (2013.01); *H02J 13/00* (2013.01)

(58) Field of Classification Search
CPC ........ H01R 9/00; H01R 25/00; H01R 25/003; H01R 17/00; H01R 31/02
USPC ................. 439/188, 488, 652–653, 638, 300; 361/119
See application file for complete search history.

(56) References Cited

U.S. PATENT DOCUMENTS

| | | | | |
|---|---|---|---|---|
| 5,579,201 | A  * | 11/1996 | Karageozian | 361/119 |
| 6,454,609 | B1 * | 9/2002 | Huang | 439/652 |
| 7,347,734 | B1 * | 3/2008 | Teitelbaum | 439/652 |
| 7,520,783 | B2 * | 4/2009 | Chou et al. | 439/652 |
| 8,004,115 | B2 * | 8/2011 | Chapel et al. | 307/64 |
| 2009/0289501 | A1* | 11/2009 | Garb | 307/39 |
| 2011/0163600 | A1* | 7/2011 | Garb et al. | 307/35 |

* cited by examiner

*Primary Examiner* — Chandrika Prasad
(74) *Attorney, Agent, or Firm* — Dwayne E. Rogge; Schacht Law Office, Inc.

(57) ABSTRACT

The Universal 220-240V Power Strip for 110-120V Outlet provides the ability to use 220-240V electronic devices in standard 110-120V outlets. The Universal Power Strip is the similar to a standard power strip but features multiple country plugs and two power cables which will be plugged into two different power outlets instead of one. By this method the Universal Power Strip will increase the electricity from 110-120V to 220-240V and power the 220-240V devices. Notably, residences in North America are pre-wired with a 220-240V circuit, and this device will allow full usage of the system.

6 Claims, 2 Drawing Sheets

GROUND CIRCUIT IS NOT SHOWN

GROUND CIRCUIT IS NOT SHOWN

POWER STRIP HAVING A FIRST POWER CORD WITH A 110-120V PLUG AND A SECOND POWER CORD WITH A 220-240V PLUG

SUMMARY OF INVENTION

It is an object to provide a new and improved power strip that can be used to power high voltage devices without the use of a step up transformer. This can be achieved with two different plugs connected to two different sources of circuits. The power strip uses two different 110-120V currents to create combined voltage of 220-240.

A switch can be included with surge protection, or overload protection, either with Ground Fault Circuit Interrupters/GFCI and or Arc Fault Circuit Interrupters/AFCI. The device can also accommodate an indicator pilot light and also relays to avoid electrocution.

BRIEF DESCRIPTION OF THE DRAWINGS

The accompanying drawings illustrate various embodiments of the invention and serve to explain the principles of the invention. Included in the drawings are reference numbers to represent different components.

DETAILED DESCRIPTION OF THE INVENTION

Figure 1:
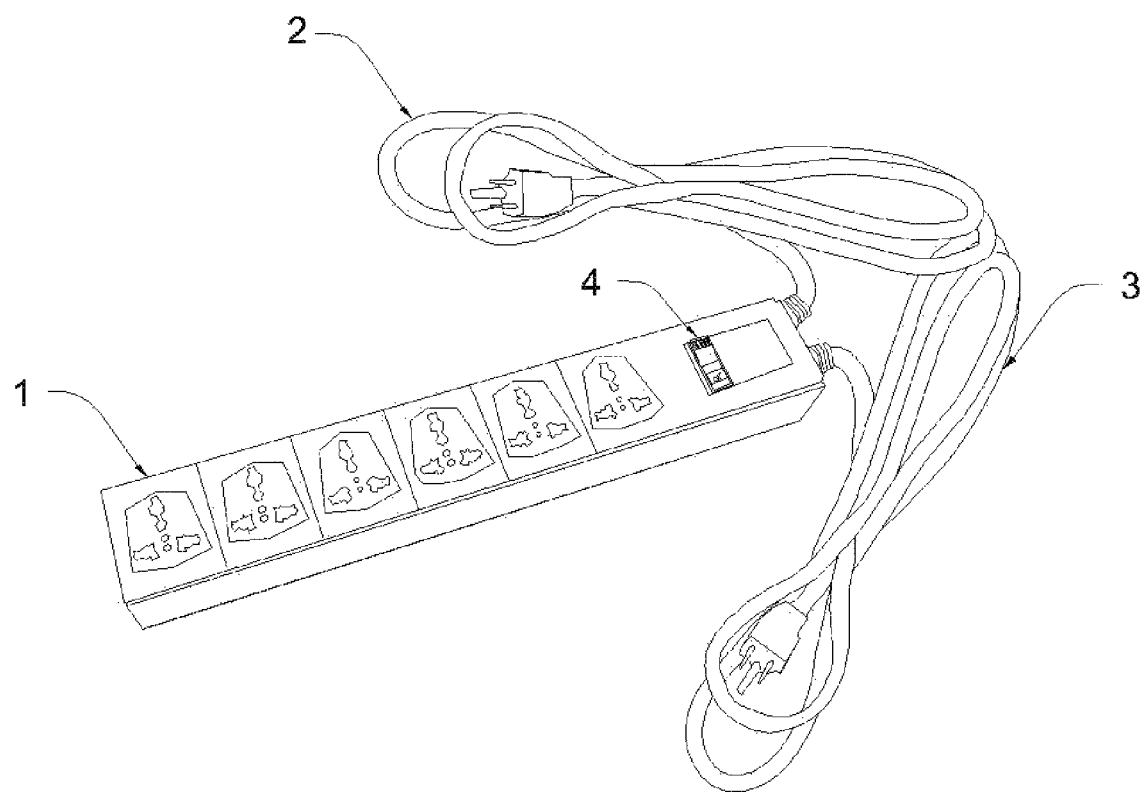
FIG. 1 is a top perspective view of the power strip constructed according to the other standard universal power strips.
1. Power strip (bar) with foreign 220-240V sockets
2. L1 Power cord polarized and grounded
3. L1 Power cord polarized and grounded
4. Lighted switch can combine overload protection, surge protection, and GFCI or AFCI
Figure 2:
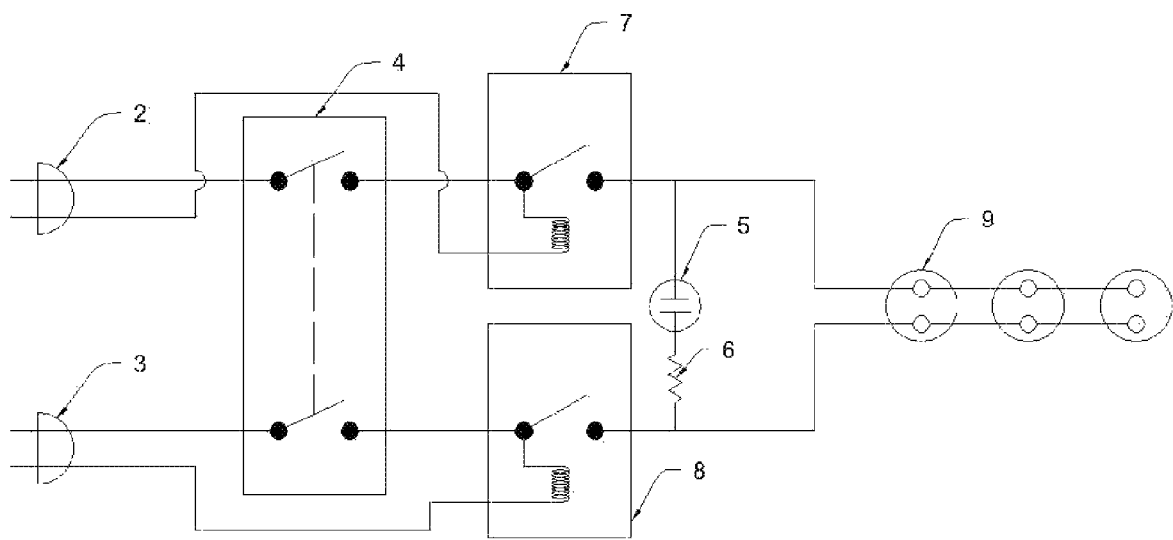
FIG. 2 is the electrical circuits using symbols
5. Pilot/neon light
6. Resister for bulb protection
7. Relay for line 1 to prevent back flowing of electricity.
8. Relay for line 2 to prevent back flowing of electricity.
9. Power outlets

The present invention relates generally to a power strip that converts 120V to 240V without the use of step up transformers. The purpose is to allow foreign or domestic 240V devices to be used safely on conventional 120V outlets in the North American market.

Power strips known worldwide and commonly used to provide a plurality of ancillary outlets for a single conventional wall outlet. The universal power strip provides convenience with the use of multiple outlets and multiple plugs from different countries.

A standard power strip is a device that allows multiple electrical devices to be plugged in to a single electrical outlet. By having several electrical outlets encased in one housing, connected by one flexible cord, users can use multiple electrical devices with one available outlet. Standard power strips only allow devices of the same voltage as the outlet to be powered.

If a user has multiple electronic devices from overseas which require 220-240V but live in or visiting North America where 110-120V is the standard, the devices cannot be used without an expensive and cumbersome step up voltage transformers. Otherwise people hardwire their electric devises to the 40 A stove circuit or 30 A dryer circuit. Houses in North America come pre-wired with a 220-240V circuit. This device safely utilizes two 15 A circuits to use on small to medium foreign electric devices requiring 220-240V circuits without modifications to the existing wiring of the building.

This power strip uses two 110-120V NEMA 5-15 power cord plugs to create 220-240V output.

It requires a safety circuit to prevent electrocution using two relays on the exposed plug while the electric device is attached to the power strip. The relays prevent back flow of electricity when one plug is unplugged from a 110-120V outlet to also prevent electrocution.

The housing will feature one or more 220-240V outlets connected via two power lines This power strip uses two separate lines in the housing using the NEMA 5-15 plug, which has two differently sized flat parallel blades. The neutral blade is wider than the live blade, so the plug can be inserted only one way.

The power lines can also contain many safety devices that include relays and overload protection, surge protection, GFIC, AFC, etc.

The invention being claimed is an electrical power strip, comprising of:

1. An electrical power strip comprising:
   at least one female 220-240V outlet socket accessible from outside a housing of the power strip housing;
   each outlet socket configured to provide electrical power to an electrical device;
   a first power input cord having on a first end a male NEMA 5-15 110-120V plug;
   the first power cord having a second end electrically coupled to a first relay;
   the first relay electrically coupled to the 220-240V outlet sockets;
   a second power cord having on a first end a male NEMA 5-15 110-120V plug;
   the second power cord having a second end electrically coupled to a second relay electrically independent of the first relay; and
   the first relay and the second relay electrically coupled in parallel to the 220-240V outlet sockets.

2. The electrical power strip as recited in claim 1 wherein the first relay and the second relay are within the housing.

3. The electrical power strip as recited in claim 1 further comprising overload protection.

4. The electrical power strip as recited in claim 1 further comprising surge protection.

5. The electrical power strip as recited in claim 1 further comprising overload protection.

6. The electrical power strip as recited in claim 1 wherein:
   the first relay is configured to prevent backflow of electricity to the second power cord; and
   the second relay is configured to prevent backflow of electricity to the first power cord.

* * * * *